US012404708B2

(12) United States Patent
Rivera

(10) Patent No.: US 12,404,708 B2
(45) Date of Patent: Sep. 2, 2025

(54) DOOR HINGE MASKING TAPE AND METHOD OF USE

(71) Applicant: David Rivera, Dacula, GA (US)

(72) Inventor: David Rivera, Dacula, GA (US)

( * ) Notice: Subject to any disclaimer, the term of this patent is extended or adjusted under 35 U.S.C. 154(b) by 85 days.

(21) Appl. No.: 18/510,071

(22) Filed: Nov. 15, 2023

(65) Prior Publication Data

US 2025/0154811 A1 May 15, 2025

Related U.S. Application Data

(63) Continuation-in-part of application No. 17/693,332, filed on Mar. 12, 2022, now Pat. No. 11,964,292.

(60) Provisional application No. 63/162,463, filed on Mar. 17, 2021.

(51) Int. Cl.
*E05D 11/00* (2006.01)
*B05B 12/24* (2018.01)

(52) U.S. Cl.
CPC .......... *E05D 11/0054* (2013.01); *B05B 12/24* (2018.02)

(58) Field of Classification Search
CPC ................. E05D 11/06; E05D 11/0054; E05D 2011/0063; E05D 2011/0072; E05D 3/122; E05D 1/00; E05D 5/06; E05D 7/009; E05D 3/02; E05C 17/54; E05Y 2900/132; E05Y 2900/502; E05Y 2600/46; E05Y 2600/41; E05Y 2201/484; E05Y 2201/496; E05Y 2201/10; E05Y 2201/11; Y10T 16/533; Y10T 16/5335; Y10T 16/541; Y10T 16/542; Y10T 16/5388; E05F 1/1215; B64C 1/1461; B05B 12/20; B05B 12/22; B05B 12/24
See application file for complete search history.

(56) References Cited

U.S. PATENT DOCUMENTS 3,032,181 A * 5/1962 Hutter ........................ C09J 7/21 428/40.1
5,056,191 A * 10/1991 Love ....................... B05B 12/24 16/250
5,198,031 A * 3/1993 Derstine ................. B05B 12/20 118/301
5,640,827 A * 6/1997 Van Someren ......... B05B 12/24 52/750

(Continued)

FOREIGN PATENT DOCUMENTS

JP 5969825 B2 * 8/2016

*Primary Examiner* — Chuck Y Mah
(74) *Attorney, Agent, or Firm* — Alfred M. Walker; John F. Vodopia

(57) ABSTRACT

A method of use protects a door hinge from splattered paint while allowing movement of the door, because the barrel portion is covered by the non-adhesive central portion of a masking tape. Use of a specialized roll of painter's masking tape includes the steps of having a longitudinal narrow region in the center without adhesive, in between two outer left and right regions which include adhesive. This non-adhesive center region is sized to match the circumference of the pin barrel exposed on the front of the hinge when opened flat. The tape is cut at predetermined lengths to form disposable masks for masking door hinges. The same tape is used for masking at least a portion of both the front butt plates as well as all of the back pin barrel side of the hinge. The front mask does not impede movement of the attached pivotably openable door.

21 Claims, 5 Drawing Sheets

(56) References Cited

U.S. PATENT DOCUMENTS

| | | | | | |
|---|---|---|---|---|---|
| 5,722,120 | A * | 3/1998 | Bindschatel | B05B 12/24 | 16/250 |
| 5,776,572 | A * | 7/1998 | Lipson | C09J 7/22 | 428/40.1 |
| 5,998,018 | A * | 12/1999 | Murakami | C09J 7/29 | 428/354 |
| 9,181,749 | B1 * | 11/2015 | Davis | E05D 11/0054 | |
| 2002/0004103 | A1 * | 1/2002 | Lynch | B05D 1/32 | 427/468 |
| 2002/0004133 | A1 * | 1/2002 | Nakib | B05B 12/24 | 428/354 |
| 2003/0213097 | A1 * | 11/2003 | Bowers | E05D 11/0054 | 16/250 |
| 2004/0154129 | A1 * | 8/2004 | Martinez-Munoz | E05D 11/0054 | 16/250 |
| 2005/0081333 | A1 * | 4/2005 | Emerson | E05D 11/0054 | 16/250 |
| 2008/0244867 | A1 * | 10/2008 | Tuell | E05D 11/0054 | 16/250 |
| 2015/0298155 | A1 * | 10/2015 | Sackler | B05B 12/24 | 428/43 |
| 2016/0076287 | A1 * | 3/2016 | Sandoval | E05D 11/0054 | 16/250 |
| 2021/0147718 | A1 * | 5/2021 | Dudding | B05B 12/24 | |

* cited by examiner

DOOR HINGE MASKING TAPE AND METHOD OF USE

RELATED APPLICATIONS

This application is a continuation-in-part of application Ser. No. 17/693,332, filed Mar. 12, 2022 and claims benefit and priority in part under 35 USC § 120. The '332 application claims benefit of provisional application No. 63/162,463, filed Mar. 17, 2021, and claims priority in part therefrom under 35 U.S.C. § 119 (e) therefrom. The '332 application and the '463 provisional application are incorporated by reference herein.

FIELD OF THE INVENTION

This invention is related to specialized masking tape for efficient masking of door hinges prior to painting, and to its method of use for this task.

BACKGROUND OF THE INVENTION

The prior art has addressed this subject in a variety of ways. First of all are inventions pertaining to specialized masking tapes for other applications. In U.S. Pat. No. 5,354,614 of Cox et al. a masking tape with a stiffened longitudinal edge is described. The stiffened edge is not adhesive covered and is intended for masking gaskets by slipping it underneath. Since the stiffened edge is thicker than adjacent section, a release liner to prevent oxidation of the adjacent adhesive layer is used. In U.S. Pat. No. 6,444,307 of Tuoriniemi a variety of masking tape embodiments for a variety of applications (not including door hinges) are described. In the first embodiment, conventional masking tape which is wound on a roll with the adhesive side out is used for easy guidance along a window frame to mask glazing panels. Other tapes described have longitudinal pleats for protecting inside or outside corners. Still other tapes described have longitudinal areas of release liners, adhesives of various degrees of adhesion in areas, as well as anti-stick regions and creases.

Two patents relate to using disposable adhesive backed tape-like masks useful for door hinges where the doors have been removed prior to painting. U.S. Pat. No. 3,961,602 of Dresser describes a box full of separate rectangular butt covers which are peeled from a backing layer and applied to each half-hinge by adhering to the butt and then wrapping around the hinge pin barrel. In a similar application, U.S. Pat. No. 5,722,120 of Bindschatel et al. describes pre-stamped half-hinge adherent covers which are peeled off a release liner backing on a roll and applied.

Tapes with non-adhesive central longitudinal regions are disclosed in the U.S. Pat. No. 3,032,181 of Rutter and U.S. Pat. No. 9,643,202 of Sackler.

Prior art hinge protectors (usually in the form of pre-cut stamped patches) such as in U.S. Pat. No. 8,317,957 B2 of Schivley are cumbersome and time consuming to peel off of release layers from stacked orientations, and they are usually static so the painting cannot be done while moving the door pivotably during the painting process. The Schivley '957 patent is apparently being marketed by 3M as "3M Painter's Masking Tape, Corners and Hinges".

Two patents for masking door hinges on attached doors use reusable magnetically attached masks. These masks require that the hinges have magnetic attraction; they are therefore not of use for masking brass or aluminum hinges. Derstine's mask for door hinges (U.S. Pat. No. 5,198,031) comprises two flexible magnetic butt plates attached together at the center bridging the hinge pin barrel by a flexible spine member. The butt plates are of rubber construction with embedded magnetic particles. This mask covers the face of the hinge and permits opening of a door to 180 degrees when installed. A separate hinge pin barrel cover for the opposite side of the hinge with door closed is made of resilient material such as aluminum and is snapped onto barrel prior to painting. U.S. Pat. No. 6,883,205 of Martinez-Munoz shows a front hinge cover of resilient material with two thick shaped magnetic edges with a gap in the center to accommodate the hinge pin barrel. When attached by magnetic attraction to the two butt plates, they allow for opening of the door to 180 degrees. A back side pin barrel mask is attached to a closed door by elastic attachment since the material used is like a "large rubber band".

OBJECTS OF THE INVENTION

It is therefore an object of the present invention to provide a specialized roll of painter's masking tape which has a longitudinal narrow region in the center without adhesive, in between two outer left and right regions which include adhesive.

It is also an object of the present invention to provide a non-adhesive center region in painter's masking tape which is sized to match the circumference of the pin barrel exposed on the front of the hinge when opened flat.

It is yet another object of the present invention to provide a painter's masking tape which can be cut into discrete strips without the need of specialized templates.

It is also an object of the present invention to provide a painter's masking tape which is used for masking both at least a part of the front butt plates, as well as the back pin barrel side of the hinge.

It is further an object of the present invention to provide a painter's masking tape which does not stick unwanted adhesive onto the barrel of a hinge, and therefore which would impede movement of the attached door.

It is yet another object of the present invention to provide a painter's masking tape applied to a barrel hinge upon a door, which permits the door having the tape-covered hinge to be opened up to 180 degrees while being painted.

Other objects which become apparent from the following description of the present invention.

SUMMARY OF THE INVENTION

In keeping with these objects and others which may become apparent, the present invention uses a specialized roll of masking tape to form disposable masks for masking door hinges. The same tape is used for masking both the front butt plates (also known as butt leaves) as well as the back pin barrel side of the hinge. While the tape may cover both front butt plates, preferably covering only a portion of the butt plates adjacent to the barrel of the hinge is necessary. For example, preferably the tape will cover about at least ¼" portions of the butt plates adjacent to the barrel need be covered. Although the width of the tape portions on each side of the pin barrel is preferably about ¼" each, other optional embodiments of each tape portion can cover more than ¼" of the butt plates adjacent to the rotatable pin barrel, up to and including the entire width of each butt plate, located respectively on left and right sides of the pin barrel of the hinge. The front mask does not impede movement of the attached door which can be opened to 180 degrees. Since it is simple to manufacture, the special masking tape is very inexpensive. Although trimming with a utility knife is required, the form-fitting tape of correct size simplifies the operation greatly over the use of ordinary painter's tape thereby saving valuable time.

Standard sized interior door hinges have been used for over half a century for residential buildings. For example, in the USA the standard size is the 3" hinge which is 3" wide when laid open and 3" in length, or the 4" hinge which is 4" wide when laid open. Other larger hinges have barrels which are wider than the barrels in the 3 and 4 inch wide hinges. For example larger hinges may have a barrel circumference of 1.75 inches (1¾"). With tape lengths which have a width of 2.5 inches (2½") the non-adhesive middle portion is preferably 1.5 inches (1½") in width leaving opposite side adhesive portions of 0.5 inches (½") on each side of the non-adhesive middle portion. The 1.5 inches (1½") for the middle non-adhesive portion can overlap over smaller diameter barrel hinges because there will be enough coverage of the adhesive side portions on the side left and right barrel hinges. Also the larger hinges with the 1.75 inches (1¾") may have barrels that extend outward from a portion of the side plates, which extend beyond the door being held by the large hinge. Therefore, there is a larger area on the plates to accept the side adhesive portions of one-half inch (½") on each side of the barrel having the circumference of 1.75 inches (1¾"). Therefore, in the alternate embodiment the 2.5 inch (2½") wide tape can be used to cover both small hinges and large hinges. Furthermore, for smaller hinges, such as on China cabinet or kitchen cabinet type doors, the hinges may require a smaller tape with a non-adhesive portion less than 0.75 inches (¾"). For example, for the China cabinet or kitchen cabinet type doors, the barrel hinge is typically 1.1875 inch (1³⁄₁₆") wide, with opposite side plates that are 0.5 inch (½") in width, and the moveable barrel portion being 0.1875 inches (³⁄₁₆"). Therefore, the circumference of the barrel is π times 0.1875 which equals 0.58875 inches. However, 50-60% of the circumference would be hidden behind the front portion of the 40-50% so that the non-adhesive portion needs to be about one-half of 0.58875 inches which is about 0.294 inches. Therefore, for smaller cabinet hinges the tape would need to be no more than about 1.1875 inches (1³⁄₁₆") in width. Many regions of the world may have metric standard hinges which differ slightly from these dimensions. These hinges may have square corners or rounded corners, but a specialized masking tape of this invention sized for masking the many millions of such hinges would be compatible with either corner design. Other door hinges such as for outside entry doors are larger but also of generally standard size thereby ensuring a substantial market for a masking tape sized to be used with them.

Masking the front side of a hinge with an attached door involves somehow preventing paint from covering or splattering on the two butt plates or the pin barrel in the center. Using ordinary painter's tape involves opening the door to reveal the hinge face and then carefully attaching masking tape to cover the hinge area, and then trimming with a utility knife. Any tape adhered to the pin barrel will impede opening or closing the door since it interferes with the relative motion of the pin barrel sectors attached to their respective butt plates.

Using the tape of this invention, the painter would tear or cut a piece from the roll longer than the hinge. The tape has a longitudinal narrow region in the center without adhesive. This region is sized to match the circumference of the pin barrel exposed on the front of the hinge when opened flat. This region can either be formed by masking it from adhesive spraying during manufacture, or it can be formed by spraying the region with a barrier coat after adhesive is sprayed on the backing during manufacture. The adhesive regions covering the sides of the tape match at least a portion of the width of the butt plates of the hinge, preferably each about ¼" width on the butt plates on the left and right sides of the centrally located pin barrel of the hinge. The method of use is to align one outer side edge of the tape spaced apart from, and parallel with, the outer edge of the hinge butt plate and then smooth it onto the hinge to the center. Then the free distal edge of the tape is aligned spaced apart from, and parallel with, the outer edge of the other butt plate and is smoothed onto the hinge toward the center. If this operation is performed on a door open less than 180 degrees, the center pin barrel portion of the center of the tape will be loose and set a small distance away from the surface of the pin barrel, but still offering paint splatter protection. If the remaining portion of the butt plate needs to be protected from paint, then conventional painter's tape can cover the remaining portion of the hinge butt plates/leaves. In this way, the door can be opened up to 180 degrees and closed at will with the front tape in place. The length of the tape and the corners (if rounded) are then trimmed rapidly with a utility knife.

The same tape of this invention can be used to quickly mask the back side of the hinge barrel and small sections of exposed butt plate by closing the door and working from the opposite side. Again, a length of tape longer than the hinge is cut or torn from the roll. The center of the tape is then aligned with the center of the exposed pin barrel and then the free edges of the tape are pressed around the pin barrel and smoothed on each side of the exposed pin barrel and to at least a portion of butt plate sections on each side of the pin barrel. For example, the adhesive portion on each side of the pin barrel can be as small as about ¼" in the left and right butt plate/leave portions adjacent to the pin board. In an alternate embodiment, the adhesive edges on the left and right sides can be provided to cover more, or all, of each butt plate/leave on either side of the pin barrel. It is noted that only a very small region of adhesive attaches to the pin barrel since the center region has no adhesive. Another small region of adhesive attaches to the small sections of exposed butt plate. The excess tape is then quickly trimmed from around the hinge. It is noted that the door can still be operated (i.e., opened and closed) even with the back and front masking tapes of this invention in place. Since only a very small area of adhesive covered tape is attached to the pin barrel, it should not impede relative motion of the pin barrel segments because it will just tend to de-attach in those areas because the tack of the adhesive is not high. The adhesive further down attached to the exposed butt plate regions will keep the mask in place and will function as desired when the door is again closed.

In an alternate embodiment, the tape has tear perforations transverse to its length at every interval equal to the length of the hinge. In this manner, accurately measured lengths of tape can just be ripped from the roll by hand. This reduces the knife trimming required for both the front hinge face as well as the back hinge masking.

Therefore, the present invention describes a method of protecting door hinges on movable doors during painting of the door, using a specialized roll of painter's masking tape which has a longitudinal narrow region in the center without adhesive, in between two outer left and right regions which include adhesive. This non-adhesive center region is sized to match the circumference of the pin barrel exposed on the front of the hinge, when opened flat. The tape is manually cut "in situ" by the painter, at predetermined lengths to form disposable masks for masking door hinges. The same tape is used for masking both the front butt plates as well as the back pin barrel side of the hinge. Most importantly, the non-adhesive front central part of the masking tape does not impede movement of the attached door during painting, which can be opened all the way up to 180 degrees.

If the masking tape did not have the non-adhesive middle portion, the adhesive middle portion which rip apart when the barrel hinge was moved, and would leave an undesirable adhesive residue on the rotatable barrel of the hinge, thereby making the barrel part sticky and less movable.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
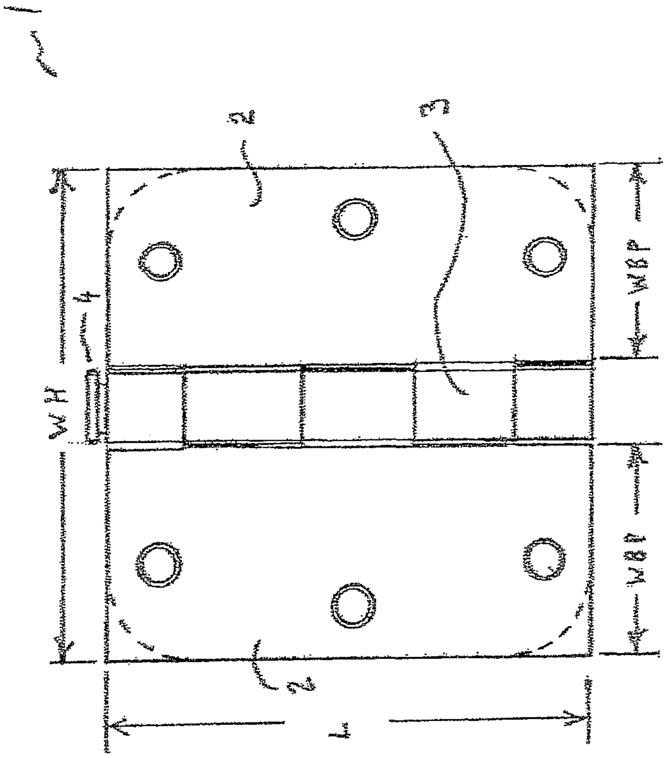
Fig. 1 (Prior art)
FIG. 1 is a front plan view of a prior art open door hinge with key dimensions shown.

FIG. 1 shows a typical prior art door hinge 1 laid flat open with key dimensions shown. Hinge 1 has butt plates 2 (also known as butt leaves), pin barrel 3 and hinge pin 4. The width (WH), length (L), and width of each butt plate (WBP) are shown. Hinge 1 is shown with square corners, but an alternate shape even more currently popular has rounded corners as shown by the dashed lines. A 3" hinge model 08-1100 produced by The Stanley Works of New Britain, CT has square corners and WH=3", L=3", and WBP=1.25".

Figure 2:
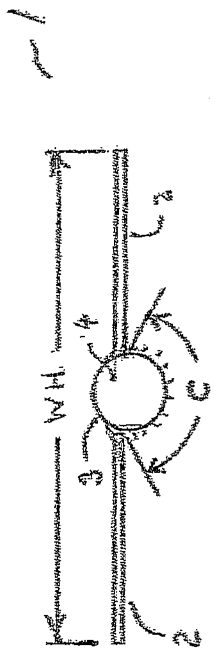
Fig. 2 (Prior art)
FIG. 2 is a top view of the open hinge of prior art FIG. 1 showing the key circumference dimension pertaining to the specialized masking tape of this invention.

FIG. 2 is a top view of the prior art hinge of FIG. 1 showing circumference C of the exposed front section of pin barrel 3 when hinge 1 is laid flat (open 180 degrees). For the 3" hinge, this dimension is approximately 0.75". In drawing FIG. 2, there is shown a top view of the hinge of FIG. 1, but showing the circumference "C" of the exposed front section of pin barrel 3, when the hinge 1 is laid flat (open 180 degrees). Larger Hinges may have circumferences of the exposed pin barrel proportionately larger than 0.75".

Figure 4:
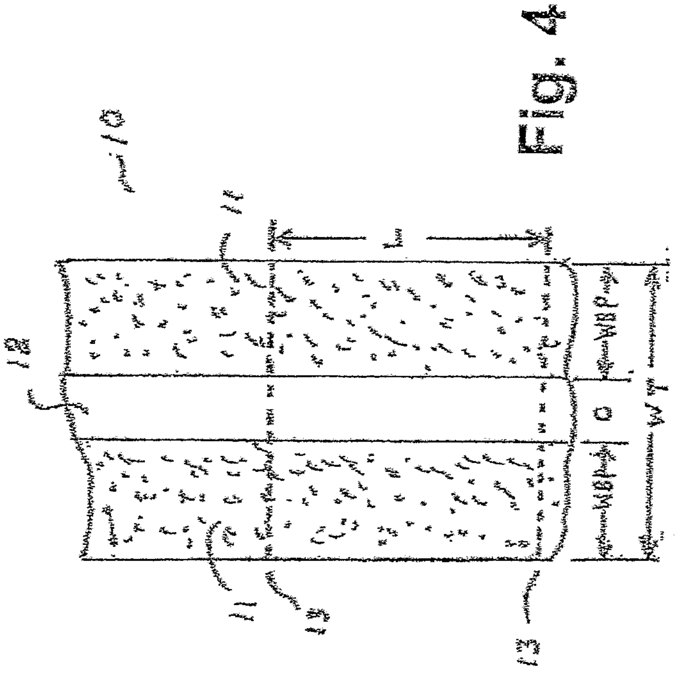
FIG. 4 is a plan view of a length of tape of FIG. 3 showing the adhesive regions and the non-adhesive central regions with dimensions. Also shown are the perforation lines of the alternate embodiment.
Figure 3:
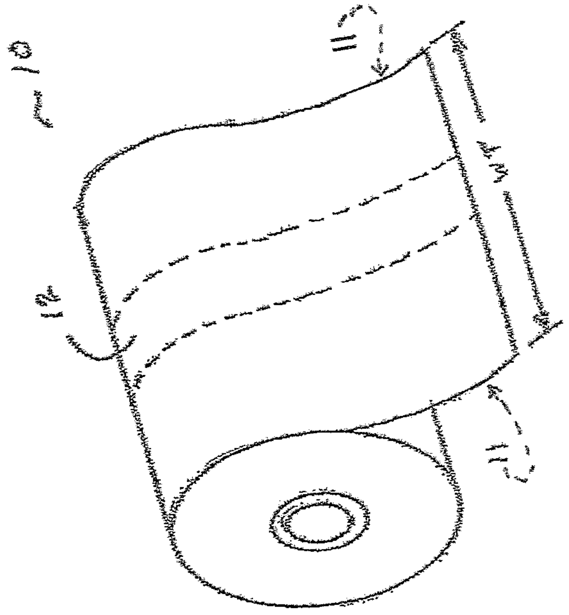
FIG. 3 is a perspective view of one embodiment of a roll of specialized masking tape of this invention and FIG. 3A is a perspective view of a thinner, preferred embodiment of a roll of specialized masking tape of this invention.
Figure 4A:
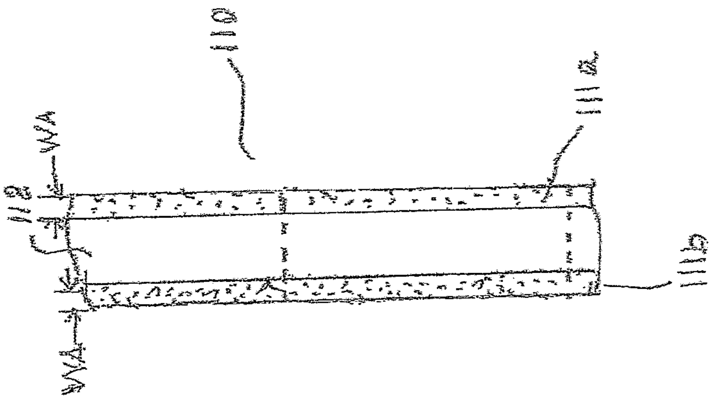
FIG. 4A is a plan view of a length of tape of FIG. 3A, showing the thinner preferred embodiment with thinner adhesive regions and the non-adhesive central region with dimensions, together with perforation lines of a further alternate embodiment.
Figure 3A:
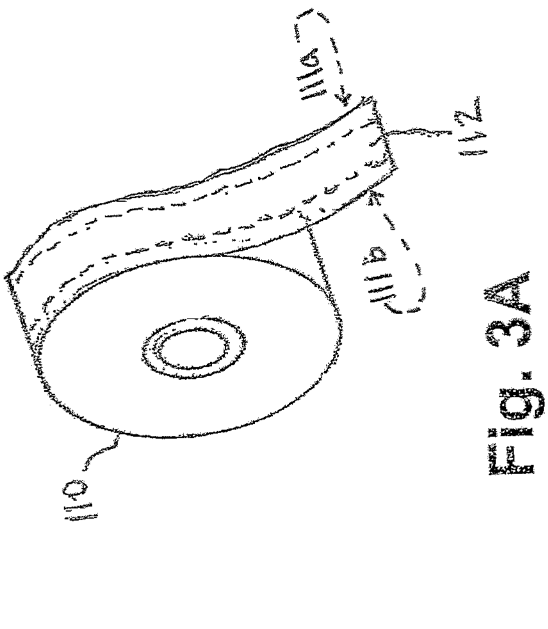

FIG. 3 shows a roll of specialized masking tape 10 of this invention with normal placement of adhesive on the inner side and plain backing showing on the outside. The width of the tape (WT) is indicated as well as the adhesive side sections 11 separated by a central non-adhesive strip 12. FIG. 3A shows a preferred embodiment of a roll of special red masking tape 110 with normal placement of adhesive on the two outer edge strips 111*a* and 111*b*, of about ¼" wide each, located on an inner side of tape 110 and plain backing showing on the outside. The thin widths 111*a* and 111*b* are shown as widths "WA". In non-preferred embodiments, the widths can be wider up to the width of each hinge, A length of tape 10 with adhesive side showing is illustrated in FIG. 4, where the adhesive sections cover all of the WBP widths of the hinge. But optionally, it is noted that the dimensions of the side adhesive areas 11 match at least a portion, such as ¼" of the butt plate width (WBP) shown in FIG. 4A, and central non-adhesion area 12 measuring C width equal to the circumference section shown in FIG. 2. It is noted that the width of tape 10 (WT) may be narrower or wider than the width of hinge 1 (WH). In an alternate embodiment, perforations 13 are placed at L intervals to facilitate easy ripping of exact length segments for masking either the front or back side of the door hinges. FIG. 4A shows a preferred embodiment for a length of tape 110 with adhesive sides 111*a* and 111*b*, each about ¼" in width. The non-adhesive mid-section 112 measuring C width equal to the circumference C width, is shown in FIG. 2. Perforations may be used to tear off sections of tape 110.

Figure 5:
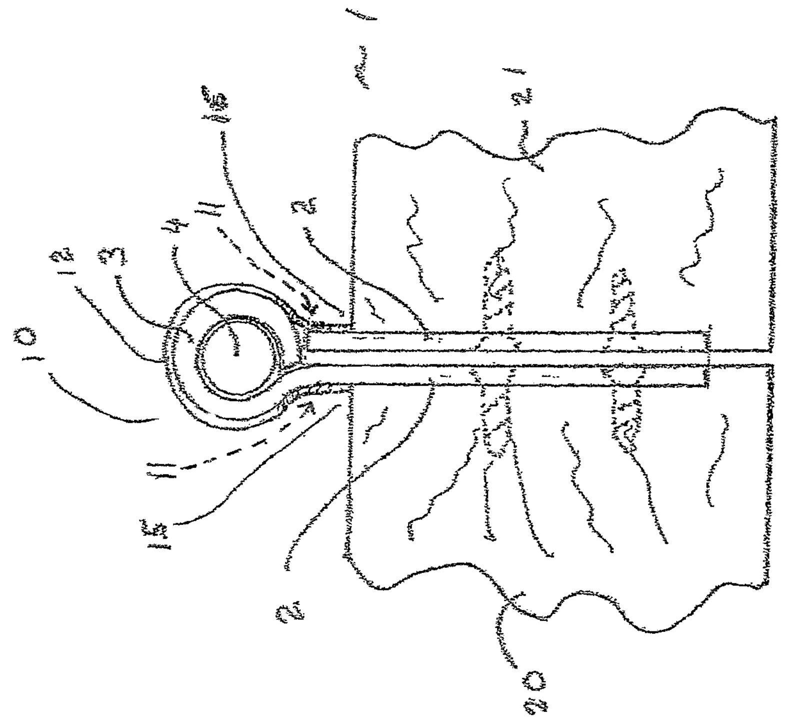
FIG. 5 is a bottom view of a hinge in a closed-door position as installed between door and door jamb (which are shown in cross section). Masking of the back side of the hinge using the tape of this invention is also illustrated.

FIG. 5 shows a bottom view of installed hinge 1 as screwed between door 20 and door jamb 21 in a door-closed configuration. The masking of the back side using masking tape 10 is shown. It is noted how 0.75" non-adhesive region 12 of tape 10 is centered on hinge pin barrel 3. The adhesive regions of tape 10 are shown at 11 and cover a small portion of pin barrel 3 and the exposed sections of butt plates 2. After pressing tape 10 around pin barrel 3 and butt plates 2, a utility knife is used to cut tape 10 at the juncture of butt plate 2 and door 20 at 15 and at the juncture of butt plate 2 and door jamb 21 at 16. It is noted that the small regions of low tack adhesive 11 on the round portion of pin barrel 3 will likely detach if door 20 is opened, however the portions of tape 10 attached to butt plates 20 will hold the mask attached on the back side and will revert to the configuration shown when the door is again closed in preparation to painting the back side. Because the non-adhesive central portion of the masking tape 10 is not adhesively attached to the barrel 3 of the hinge 1, it allows the hinge 1 to freely pivot during the 180-degree range of opening and closing the door. If the tape 10 was adhesively attached to the barrel 3 of the hinge 1, it would rip apart during movement of the barrel parts.

Therefore, the central non-adhesive portion 12 in FIGS. 3 and 4 of a painter's masking tape 10 is configured to completely cover the pin barrel 3 of a door hinge 1 where the door hinge 1 includes identical left and right butt leaves 2, 2 and a curled pin barrel 3 or knuckle, and where the left and right butt leaves 2, 2 are attached to a door 20 and a door jamb 21, respectively, and are swingingly connected via the knuckle or curled barrel 3, having therein pin barrel 4, against paint and paint sprays, without requiring the door 20 and door hinge 1 to be immobilized. When the width of the tape covers the entire pin barrel 3, but only the adjacent portions of the butt plates/leaves 2, 2, next to the pin barrel 3, conventional painter's tape can cover the uncovered remaining portions of the butt leaves 2, 2. However, as shown in FIGS. 3A and 4A for a thinner embodiment of painter's masking tape of this invention, the central non-adhesive portion 112 in FIGS. 3A and 4A of a painter's masking tape 110 is configured to completely cover the pin barrel 3 of a door hinge 1 where the door hinge 1 includes identical left and right butt plates/leaves 2, 2 and a curled pin barrel 3 or knuckle, and where the left and right butt leaves 2, 2 are attached to a door 20 and a door jamb 21, respectively, and are swingingly connected via the knuckle or curled barrel 3, having therein pin barrel 4, against paint and paint sprays, without requiring the door 20 and door hinge 1 to be immobilized.

The painter's masking tape 10 includes:

- a length of a thin, flat flexible tape member 10 arranged on a roll so that the tape member 10 can be unrolled for deployment of a door hinge 1, the tape member 10 having a face surface and a back surface is separated into equal-width, parallel, left edge and right edge sections 11, 11, and separated by a middle section 12, parallel with the left and right edge sections 11, 11, wherein the left and right edge sections 11, 11 and the middle section 12 extend along at least a portion of the entire length of the thin, flat flexible tape member 10, such as ¼" on each side of the curled pin barrel 3;
- a coating of adhesive is evenly applied over at least ¼" portions of the left and right edge sections 11, 11 of FIGS. 3 and 4, or sections 111*a*, 111*b* of FIGS. 3A and 4A, but not the middle section 12, of the back surface of the thin, flat tape member 10, as shown in FIGS. 3 and 4, or also but not the middle section 112 of the back surface of the thin flat tape member 110, as shown in FIGS. 3A and 4A; wherein the left and right edge sections 11, 11 of FIGS. 3 and 4, or sections 111*a*, 111*b* of FIGS. 3A and 4A, of the back surface of the thin, flat flexible tape member 10 or 110 are pressed against, and adhered, to cover at least ¼" portions or more of the left and right butt leaves 2, 2 such that the non-adhesive middle section 12 of FIGS. 3 and 4, or middle section 112 of FIGS. 3A and 4A, is pressed against and covers the knuckle or curled barrel 3 of the door hinge 1 to be protected against paint and paint sprays and the middle.

In the painter's masking tape 10, a width of the middle section 12 or 112 may be more or less than the respective widths of the left and right edge sections 11, 11 or 111*a*, 111*b*. In fact, the width of the non-adhesive middle section 12 or 112 is preferably sized to match an extent of the outer surface of the curled barrel 3 on a front of the door hinge 1 when the door hinge 1 is opened flat, when the left and right butt leaves 2, 2 of the door hinge 1 are coplanar and separated by the curled barrel 3.

Furthermore, the width of the non-adhesive middle section 12 or 112 is sized to match an extent of the outer surface "C" of the curled barrel, which is the arc length of the circular dimension of the barrel.

Moreover, the width of the non-adhesive middle section 12 or 112 is sized to match an extent of the outer surface "C" of the curled barrel 3, which is the radius of the barrel 3.

Optionally, the thin, flat flexible tape member 10 is manufactured to be cut into discrete strips without the need of specialized templates.

Also optionally, the thin, flat flexible tape 10 or 110 is used for masking both the front butt plates 2, 2, as well as the back pin barrel side of the hinge 1.

Consequently, upon adhering the painter's masking tape 10 or 110 to the left and right butt leaves plates 2, 2 of the door hinge 1, the door 20 with the tape-covered door hinge may be opened to 180 degrees while being painted, without tearing at the curled barrel 3. A same length of masking tape is used for masking both the front butt leave sections 2, 2 as well as a back curled barrel side of the door hinge 1.

A method of using the painter's masking tape 10 configured to cover and protect the center portion of a door hinge 1, comprising identical portions of the left and right butt leaves 2, 2 and a curled barrel 3 or knuckle, where the right and left butt leaves 2, 2 are attached to a door 20 and a door jamb 21, respectively, and swingingly connected via the knuckle or curled barrel 3, against paint and paint sprays, and without requiring the door 20 and door hinge 1 to be immobilized, and wherein the tape member 10 of FIGS. 3A and 4A, or the tape member 110, has a face surface and a back surface separated into equal-width, parallel, left edge 11 or 111*a* and right edge 11 or 111*b* sections, and a middle section 12 or 112 in parallel with the left and right edge sections 11, 11 or 111*a*, 111*b*, the method comprising the steps of:

- drawing a length of the thin, flat flexible tape member 10 or 110 from a roll sufficient in length to cover a vertical length L or portions of the right and left butt leaves 2, 2 and to completely cover the curled barrel 3 or knuckle of the door hinge 1;
- aligning one of the left and right edge sections 11, 11 of the painter's masking tape 10 with the outer edge of the left butt leave section 2 and then smooth the tape 10 to the curled barrel 3 or knuckle, or aligning left and right edge sections 111*a*, 111*b* of the tape 110 spaced apart from and parallel with the outer edges of butt leaves 2, 2;
- then, align the other right and left edge sections of the tape 10 with the outer edge of the right leave section 11, including smoothing the other right and left edge section 11 toward the center, or aligning the other edge section of the tape 110 spaced apart from and parallel to, the other leave section 111*b;*
- wherein if the door 20 is open less than 180 degrees, the middle section 12 or 112 of the tape 10 or 110 covering the curled barrel 3 or knuckle will be loose and set a small distance away a surface of the curled barrel 3 or knuckle, but still offering paint splatter protection.

The method of using the painter's masking tape 10 or 110, optionally, further comprising the step of unrolling the tape member 10's or 110's deployment at a door hinge 1.

The method of using a painter's masking tape 10 or 110, optionally includes the step of providing only a very small region of adhesive which attaches to the barrel 3 since the center region 12 or 112 has no adhesive.

The method of using a painter's masking tape 10 or 110 further optionally includes the step of providing a small region of adhesive on the left and right tape sections 11, 11, or 111*a*, 111*b*, which attaches to the small sections of exposed left and right butt leaves 2, 2 of the door hinge 1.

Figure 4B:
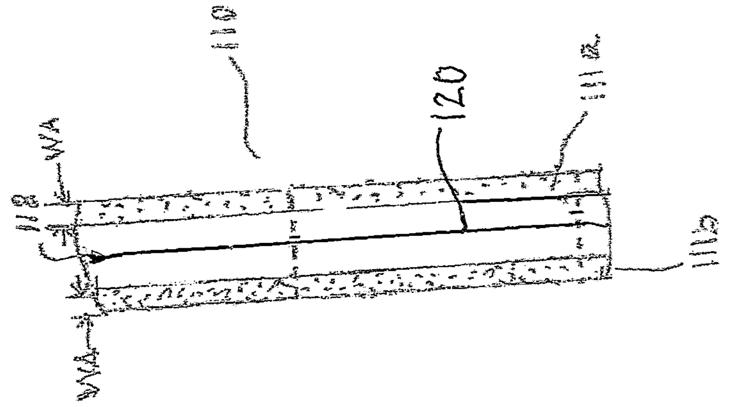
FIG. 4B is a planned view of a length of the tape of FIG. 3B showing the thinner preferred embodiment with thinner adhesive regions and the non-adhesive central region with dimensions, together with perforation lines of a further alternate embodiment.
Figure 3B:
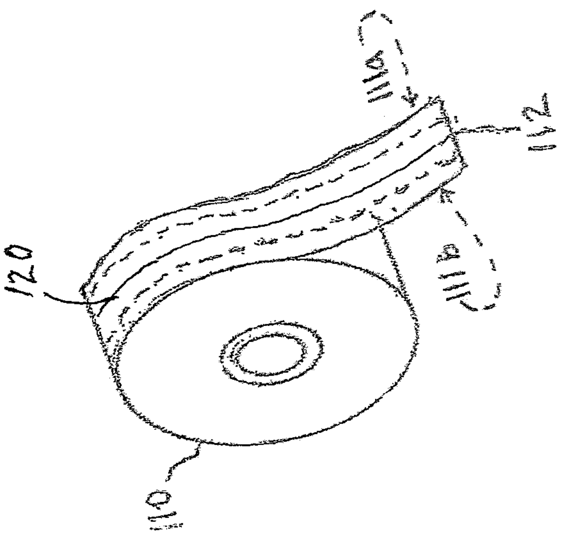
FIG. 3B is a prospective view of an alternate embodiment wherein the painter's tape is optionally provided with an axially extending mid-line to allow the user to see the mid-point of the tape when positioned over the mid-point of the exposed barrel of the barrel hinge, which is to be covered by the non-adhesive portion of the tape.

The method of using a painter's masking tape 10 further optionally includes the step of providing the tape 10 or 110 with tear perforations transverse to its length at every interval, equal to the length of a hinge 1. As shown in FIGS. 3B and 4B, the tape 110 is preferably provided with an axially extending mid-line 120 to allow the user to see the mid-point of the tape when positioned over the mid-point of the exposed barrel 3, to be covered by the non-adhesive portion 112 of the tape 110.

As shown in drawing FIGS. 3A, 3B, 4A, and 4B, other larger hinges 1 have barrels 3 which are wider than the barrels in the 3- and 4-inch-wide hinges 10. For example, larger hinges 1 may have a barrel 3, where the circumference of the barrel 3 is about 1.75 inches (1¾").

With tape lengths of the tape 110, which have a width of 2.5 inches (2½") the non-adhesive middle portion 112 is preferably 1.5 inches (1½") in width leaving opposite side adhesive portions 111*a*, 111*b* of 0.5 inches (½") on each side of the non-adhesive middle portion 112. The 1.5 inches (1½") for the middle non-adhesive portion 112 can overlap over smaller diameter barrel hinges 3 because there will be enough coverage of the adhesive side portions 111*a*, 111*b* on the side left and right side plates 2, 2 of the barrel hinges 1.

Also, the larger hinges 1 with the 1.75 inches (1¾") may have barrels 3 that extend outward from a portion of the side plates 2, 2, which extend beyond the door being held by the large hinge 1. Therefore, there is a larger area on the plates to accept the side adhesive portions of one-half inch (½") on each side of the barrel having the circumference of 1.75 inches (1¾").

Therefore, in the alternate embodiment the 2.5 inch (2½") wide tape 110 can be used to cover both small hinges 1 having widths of 3 or 4 inches and exposed barrel circumferences of about 0.75 inches to about 1.0 inches, and larger hinges 1 having widths of 5 or 6 inches and exposed barrel circumferences of 1.75 inches.

Furthermore, for much smaller hinges 1, such as on China cabinet or kitchen cabinet type doors, the hinges 1 may require an even smaller tape 110 with a non-adhesive portion 112 less than 0.75 inches (¾"). For example, for the China cabinet or kitchen cabinet type doors, the even smaller cabinet barrel hinge 1 is typically 1.1875 inch (1³⁄₁₆") wide, with opposite side plates 2, 2 that are 0.5 inch (½") in width, and the moveable barrel portion 3 being 0.1875 inches (³⁄₁₆"). Therefore, the circumference of barrel 3 is $\pi$ times 0.1875 which equals 0.58875 inches. However, 50-60% of the circumference would be hidden behind the front portion of the circumference, which would be 40-50% so that the non-adhesive portion 112 of the tape 110, needs to be about one-half of 0.58875 inches which is about 0.294 inches. Therefore, for even smaller cabinet hinges 1 the painter's tape 110 would need to be no more than about 1.1875 inches (1³⁄₁₆") in width.

It is further known that a very small region of adhesive may attach to the left and right sides of the barrel 3, since the center region of the tape 110 has no adhesive and covers the exposed portion of the respective circumferences of the barrels 3 with a non-adhesive circumferential exposed portion of between about 0.75 inches to about 1.5 inches in circumferential curved length for hinges having exposed barrel circumferences that range between 0.75 inches to about 1.5 inches.

Alternately for small cabinets, such as kitchen or China cabinets, proportionately the tape 110 would need to be no more than about 1.50 inches in width with adhesive portions 0.6 inches on each side of the barrel 3, which is covered by a non-adhesive portion of about 0.294 inches over the exposed portion of the barrel 3.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

What is claimed is:

1. A method of making and using a painter's thin, flat masking tape member configured to cover and protect a large door hinge, said large door hinge comprising identical left and right leaves and a curled barrel or knuckle, the right and left leaves attached to a door and a door jamb, respectively, and swingingly connected via the knuckle or curled barrel, against paint and paint sprays, and without requiring the door and door hinge to be immobilized, wherein the thin, flat masking tape member has a face surface and a back surface separated into equal-width, parallel, left edge and right edge sections, and a middle section in parallel with the left and right edge sections, the method comprising the steps of:

drawing and tearing off a length of said thin, flat masking tape member from a roll sufficient in length and configuring said masking tape member to cover a vertical length of the right and left leaves and to completely cover an exposed section of the curled barrel or knuckle of the door hinge, said middle section extending continuously and longitudinally along the length of said thin flat masking tape member and being free of adhesive;

aligning one of the left and right edge sections of said thin flat masking tape member with a section of the left leave section and then smoothing said thin flat masking tape member to the curled barrel or knuckle of the door hinge;

then, aligning the other right and left edge sections of the masking tape with at least a section of the left outer edge of the right leave section, including smoothing the other right and left edge section toward the center;

whereby said curled barrel or knuckle is free of any adhesive;

wherein if the door is open less than 180 degrees, the middle section of the tape covering the curled barrel or knuckle will be loose and set a small distance away from a surface of the curled barrel or knuckle, but still offering paint splatter protection without impeding movement of said door;

wherein said large door hinge has a barrel arc of at least about 1.75 inches and said length of masking tape has a width of at least 2.5 inches; and wherein only a very small region of adhesive of the thin flat masking tape member attaches to the right and left leaves of the barrel since a center region of the thin flat masking tape member has no adhesive and covers the exposed portion of the arc of the barrel with a non-adhesive arcuate section of said, thin flat masking tape member.

2. The method of claim 1, wherein the non-adhesive middle section of the thin flat masking tape member is about 1.5 inches in width leaving opposite side adhesive sections of the thin flat masking tape member of about 0.5 inches on each side of the non-adhesive middle section of the thin flat masking tape member.

3. The method of claim 1, further comprising the step of unrolling the thin flat masking tape member at said door hinge.

4. The method of claim 1, wherein said length of tape of the thin flat masking tape member is torn off at tear perforations transverse to its length at every interval equal to the length of the hinge.

5. The method of claim 1 wherein respective exposed sections of said barrels extend outwardly from a section of the side leaves which extend beyond the door held by said hinge resulting in a larger area on the leaves to accept the side adhesive sections of one half inch on each side having said arc of 1.75 inches.

6. The method of claim 1 in which said 2.5 inch wide tape is usable to cover both smaller and larger hinges.

7. The method of claim 1 in which said tape is provided with an axially extending mid-line to allow a user to see a mid-point of the tape when positioned over a mid-point of an exposed barrel of said hinge which is to be covered by the non-adhesive section of said tape.

8. A method of making and using a painter's masking tape configured to cover and protect hinges on a china or kitchen cabinet door comprising the steps of:

drawing and tearing off a length of a thin, flat masking tape member from a roll sufficient in length and configuring said masking tape member to cover a vertical length of right and left leaves of said hinges attached to said door and a door jamb, said length of said masking tape having a middle section extending continuously and longitudinally along the length of said tape and being free of adhesive;

using said length of said masking tape to cover said vertical length of the right and left leaves and to completely cover the curled barrel or knuckle of the door hinge, said middle section extending continuously and longitudinally along the length of said tape covering said curled barrel or knuckle free of adhesive;

wherein the tape member has a face surface and a back surface separated into equal-width, parallel, left edge and right edge sections, and said middle section in parallel with the left and right edge sections;

aligning one of the left and right edge sections of the masking tape with a section of the left leave section and then smooth the tape to the curled barrel or knuckle;

aligning the other right and left edge sections of the masking tape with at least a portion of the left outer edge of the right leave section, including smoothing the other right and left edge section toward the center;

wherein said hinge is about 1³⁄₁₆ inches wide with side leaves that are 0.5 inch in width, a movable section of said barrel being about ³⁄₁₆ inch in width; and wherein said tape is no more than about 1³⁄₁₆ inches in width; and whereas if the door is open less than 180 degrees, the middle section of the tape covering the curled barrel or knuckle will be loose and set a small distance away from a surface of the curled barrel or knuckle, but still offering paint splatter protection without impeding movement of said door, and only a very small region of adhesive less than ¼ inch on each side of a barrel center region attaches to the small sections of exposed left and right leaves of the barrel hinge attached to the door on one side, and to the door jamb on the opposite side of the barrel hinge.

9. The method of claim 8, further comprising the step of unrolling the tape member at said door hinge.

10. The method of claim 8, wherein said length of tape is torn off at tear perforations transverse to its length at every interval equal to the length of the hinge.

11. The method of claim 10 in which said tape is provided with an axially extending mid-line to allow a user to see a mid-point of the tape when positioned over a mid-point of an exposed barrel of said hinge which is to be covered by the non-adhesive section of said tape.

12. In combination, a door and a roll of painter's masking tape comprising:

said masking tape configured to cover and protect a large door hinge supporting said door, said hinge made up of identical left and right leaves and a curled barrel or knuckle, the right and left leaves attached to said door and a door jamb, respectively, and swingingly connected via the knuckle or curled barrel, against paint and paint sprays, and without requiring the door and door hinge to be immobilized;

said tape having a face surface and a back surface separated into equal-width, parallel, left edge and right edge sections, and a middle section in parallel with the left and right edge sections;

each length of said tape taken from said roll configured to cover a vertical length of the right and left leaves and to completely cover the curled barrel or knuckle of the door hinge, and having said middle section extending continuously and longitudinally along the length of said tape and being free of adhesive;

whereby said curled barrel or knuckle is free of any adhesive when said length of said tape covers said hinge;

wherein if the door is open less than 180 degrees, the middle section of the tape covering the curled barrel or knuckle will be loose and set a small distance away from a surface of the curled barrel or knuckle, but still offering paint splatter protection without impeding movement of said door;

wherein said large door hinge has a barrel arc of at least about 1.75 inches and said length of masking tape has a width of at least 2.5 inches; and wherein only a very small region of adhesive attaches to the right and left leaves of the barrel since a center region of said thin flat masking tape member has no adhesive and covers the exposed portion of the arc of the barrel with a non-adhesive arcuate section of said thin flat masking tape member.

13. The combination of claim 12, wherein the non-adhesive middle section is about 1.5 inches in width leaving opposite side adhesive sections of about 0.5 inches on each side of the non-adhesive middle section.

14. The combination of claim 12, wherein each length of tape on said roll is separated by tear perforations transverse to its length.

15. The combination of claim 12 wherein said barrels extend outwardly from a section of the side leaves extending beyond the door held by said hinge resulting in a larger area on the leaves to accept the side adhesive sections of one half inch on each side having said arc of 1.75 inches.

16. In combination, a door and a roll of painter's masking tape comprising:

said masking tape configured to cover and protect a china or kitchen door hinge supporting said door, said hinge made up of identical left and right leaves and a curled barrel or knuckle, the right and left leaves attached to said door and a door jamb, respectively, and swingingly connected via the knuckle or curled barrel, against paint and paint sprays, and without requiring the door and door hinge to be immobilized;

said tape having a face surface and a back surface separated into equal-width, parallel, left edge and right edge sections, and a middle section in parallel with the left and right edge sections;

each length of said tape taken from said roll configured to cover a vertical length of the right and left leaves and to completely cover the curled barrel or knuckle of the door hinge, and having said middle section extending continuously and longitudinally along the length of said tape and being free of adhesive;

whereby said curled barrel or knuckle is free of any adhesive when said length of said tape covers said hinge;

wherein if the door is open less than 180 degrees, the middle section of the tape covering the curled barrel or knuckle will be loose and set a small distance away from a surface of the curled barrel or knuckle, but still offering paint splatter protection without impeding movement of said door;

wherein said hinge is about 1³⁄16 inches wide with side leaves that are 0.5 inch in width, a movable portion of said barrel being about ³⁄16 inch in width;

wherein said tape is no more than about 1³⁄16 inches in width; and whereas if the door is open less than 180 degrees, the middle section of the tape covering the curled barrel or knuckle will be loose and set a small distance away from a surface of the curled barrel or knuckle, but still offering paint splatter protection without impeding movement of said door, and only a very small region of adhesive less than ¼ inch on each side of a barrel center region attaches to the small sections of exposed left and right leaves of the barrel hinge attached to the door on one side, and to the door jamb on the opposite side of the barrel hinge.

17. The combination of claim 16, wherein each length of tape on said roll is separated by tear perforations transverse to its length.

18. The combination of claim 16 in which said tape is provided with an axially extending mid-line to allow a user to see a mid-point of the tape when positioned over a mid-point of an exposed barrel of said hinge which is to be covered by the non-adhesive section of said tape.

19. In combination, a door and a roll of painter's masking tape comprising:

said masking tape configured to cover and protect a door hinge supporting said door, said hinge made up of identical left and right leaves and a curled barrel or knuckle, the right and left leaves attached to said door and a door jamb, respectively, and swingingly connected via the knuckle or curled barrel, against paint and paint sprays, and without requiring the door and door hinge to be immobilized;

said tape having a face surface and a back surface separated into equal-width, parallel, left edge and right edge sections, and a middle section in parallel with the left and right edge sections;

each length of said tape taken from said roll configured to cover a vertical length of the right and left leaves and to completely cover the curled barrel or knuckle of the door hinge, and having said middle section extending continuously and longitudinally along the length of said tape and being free of adhesive;

whereby said curled barrel or knuckle is free of any adhesive when said length of said tape covers said hinge;

wherein if the door is open less than 180 degrees, the middle section of the tape covering the curled barrel or knuckle will be loose and set a small distance away from a surface of the curled barrel or knuckle, but still offering paint splatter protection without impeding movement of said door;

wherein said door hinge has a barrel arc of at least about 0.1875 inches (³⁄16 inch) to about 1.75 inches, and said masking tape has a width of at least about 1 and ³⁄16 inches to about 2.5 inches; and wherein a region of adhesive attaches to the right and left leaves of the barrel wherein said center section of said thin flat masking tape member has no adhesive and covers the exposed section of the arc of the barrel with a non-adhesive arcuate section of said thin flat masking tape member.

20. The combination of claim 19 in which said tape is provided with an axially extending mid-line to allow a user to see a mid-point of the tape when positioned over a mid-point of an exposed barrel of said hinge which is to be covered by the non-adhesive section of said tape.

21. The combination of claim 19 in which said middle non-adhesive section of the thin flat masking tape member overlaps over smaller barrel hinges as there would then be enough coverage of the adhesive side sections of the thin flat masking tape member on the left and right side leaves of the barrel hinge.

* * * * *